(12) United States Patent
Ojiro

(10) Patent No.: US 10,508,829 B2
(45) Date of Patent: Dec. 17, 2019

(54) WATER HEATER

(71) Applicant: Rinnai Corporation, Nagoya-shi, Aichi (JP)

(72) Inventor: Takashi Ojiro, Nagoya (JP)

(73) Assignee: Rinnai Corporation, Nagoya-shi, Aichi (JP)

(*) Notice: Subject to any disclaimer, the term of this patent is extended or adjusted under 35 U.S.C. 154(b) by 0 days.

(21) Appl. No.: 15/760,245

(22) PCT Filed: Oct. 17, 2016

(86) PCT No.: PCT/JP2016/080673
§ 371 (c)(1),
(2) Date: Mar. 15, 2018

(87) PCT Pub. No.: WO2017/069078
PCT Pub. Date: Apr. 27, 2017

(65) Prior Publication Data
US 2018/0340707 A1    Nov. 29, 2018

(30) Foreign Application Priority Data

Oct. 19, 2015  (JP) ................. 2015-205777

(51) Int. Cl.
*F23D 14/14* (2006.01)
*F24H 1/14* (2006.01)
(Continued)

(52) U.S. Cl.
CPC ............ *F24H 1/145* (2013.01); *F23D 14/02* (2013.01); *F23Q 3/00* (2013.01); *F23Q 3/008* (2013.01); *F23D 2900/00012* (2013.01)

(58) Field of Classification Search
CPC ..................................................... F24H 14/14
See application file for complete search history.

(56) References Cited

U.S. PATENT DOCUMENTS

2005/0178344 A1* 8/2005 Garrett ................... F23D 14/36
                                                        122/17.1
2013/0164697 A1* 6/2013 Tanaka .................. F23M 20/00
                                                        431/114
(Continued)

FOREIGN PATENT DOCUMENTS

CN      2422578      3/2001
JP      54-153433    10/1979
(Continued)

OTHER PUBLICATIONS

International Preliminary Report on Patentability for International Application No. PCT/JP2016/080673 dated Apr. 24, 2018.
(Continued)

*Primary Examiner* — Nathaniel Herzfeld
(74) *Attorney, Agent, or Firm* — Amin, Turocy & Watson, LLP

(57) ABSTRACT

A water heater including a burner body (1) and a fan case (2) accommodated in casing (100), wherein the burner body (1) has a main burner body unit having a flat burner (3) on a lower surface side thereof and an introducing unit (11) protruding upward from the upper surface of the main burner body unit (12), wherein a discharging portion (53) of the ignition electrode (50) is disposed within a projection plane (180) when wall sections (13) (14) (15) (16) of the introducing unit (11) is projected downwardly.

3 Claims, 4 Drawing Sheets

(51) Int. Cl.
*F23Q 3/00* (2006.01)
*F23D 14/02* (2006.01)

(56) References Cited

U.S. PATENT DOCUMENTS

| | | | | |
|---|---|---|---|---|
| 2015/0192292 A1* | 7/2015 | Dreizler | ................. | F23D 14/34 |
| | | | | 431/329 |
| 2016/0040905 A1* | 2/2016 | Shellenberger | ......... | F24H 3/087 |
| | | | | 126/116 R |
| 2016/0377320 A1* | 12/2016 | Kim | ......................... | F24H 8/00 |
| | | | | 165/140 |

FOREIGN PATENT DOCUMENTS

| | | |
|---|---|---|
| JP | 63-12039 | 1/1988 |
| JP | 2001-021225 | 1/2001 |
| JP | 2013-234821 | 11/2013 |
| WO | 2014019835 | 2/2014 |

OTHER PUBLICATIONS

International Search Report and Written Opinion for International Application Serial No. PCT/2016/080673 dated Jan. 17, 2017, 8 pgs.

* cited by examiner

PRIOR ART

WATER HEATER

FIELD OF THE INVENTION

The present invention relates to a water heater. Especially, the present invention relates to the water heater having a downward combustion type burner.

BACKGROUND ART

FIG. 4 is a schematic configuration view of a water heater including a downward combustion type-flat burner (3a) disposed on a lower surface of a burner body (40) in such a manner that a combustion surface (30a) is disposed facedown. In the water heater, the burner body (40) is provided in an upper region of the casing (4). Additionally, a sensible heat recovery type-primary heat exchanger (311) is disposed below the combustion surface (30a) of the flat burner (3a), and a latent heat recovery type-secondary heat exchanger (321) is disposed below the sensible heat recovery type-primary heat exchanger (311).

In such a water heater, all air taken in through an air supply pipe (43) by rotating a fan (not shown) in a fan case (41) is fed as primary combustion air to a mixing device (42). The air is then mixed with fuel gas fed through a gas supply pipe (44) in the mixing device (42) to generate a mixture gas. Further, the mixture gas is fed to the flat burner (3a) having the combustion surface (30a) in such a manner that the combustion surface (30a) is disposed facedown in the burner body (40).

In the above-described water heater, in order to minimize the height of the upper region of the casing (4), a blowout port (45) which opens laterally to one side of the fan case (41) is communicated with an inlet port (310) which laterally opens to one side surface of the burner body (40), as illustrated in FIG. 4. In this configuration, the burner body (40) and the fan case (41) are aligned in a lateral direction, which results in reducing the overall height of the casing (4).

However, the mixture gas is laterally blown from the blowout port (45) provided in the one side of the fan case (41) through the inlet port (310) provided in the one side surface of the burner body (40) into the burner body (40), whereby the mixture gas is laterally supplied to the combustion surface (30a) of the flat burner (3a). Therefore, distribution of the mixture gas over the combustion surface (30a) tends to become uneven due to such a blow direction. As a result, depending on a position of an ignition electrode, there are problems that not only ignition performance degrades but combustion performance deteriorates because the mixture gas unevenly combusts over the combustion surface (30a). In view of the ignition performance, it is considered that the ignition electrode could insert through another side surface of the burner body (40) away from the blowout port (45). However, such an ignition electrode can not be attached through a frontward portion where a door opening/closing an opening of the casing (4) is provided, which results in difficulty in assembly and maintenance.

In view of the combustion performance, although not shown, a burner body having a mixture gas inlet port opening upward in a central portion of an upper surface and a fan case having a blowout port opening downward so as to be communicated with the mixture gas inlet port are used, so that an assembly structure in which the fan case stands on the upper surface of the burner body could be designed. Such an assembly structure facilitates simultaneous spread of the mixture gas over the entire interior of the burner body, which advantageously results in even distribution of the mixture gas over the combustion surface, whereas disadvantageously results in simultaneous filling of the entire interior of the burner body with the mixture gas. As a result, when spark discharge from the ignition electrode is delayed, the ignition is generated in a space filled with the mixture gas, which may cause an explosion ignition. Furthermore, according to the assembly structure described above, since the fan case accommodating a fan stands on the burner body, the overall height of the casing increases, which results in a larger water heater in size.

PRIOR ARTS (Patent Publication)
 [Patent Publication 1] Japanese Unexamined Patent Publication No. 2013-234821 A

SUMMARY OF INVENTION

The present invention has been made to solve the problems described above, and an object of the present invention are to improve ignition performance and combustion performance, and to facilitate workability in manufacturing and maintenance in a water heater including an all primary combustion type-burner having a downward combustion surface, without the need for increasing the overall size of the device.

According to the present invention, there is provided a water heater comprising a casing including a casing body having an opening in a front portion, and a door configured to open and close the opening, wherein the casing accommodates:

a burner body including a flat burner having a downward combustion surface;

a fan case being in communication with the burner body and lying on its side;

a vertical shaft fan disposed in the fan case and configured to supply a mixture gas containing combustion air and fuel gas to the burner body; and an ignition electrode disposed below the flat burner, wherein the burner body includes:

a main burner body unit having an introduction port through which the mixture gas is supplied in a substantially central portion of an upper surface thereof, and the flat burner on a lower surface thereof; and an introducing unit being in communication with the introduction port, protruding upward from the upper surface of the main burner body unit, and laterally having an inlet port being in communication with the fan case, wherein an inner surface of an opposite wall section facing the inlet port in a peripheral wall of the introducing unit has a substantially vertical surface, and a discharging portion of the ignition electrode is disposed within a projection plane when the peripheral wall of the introducing unit is projected downwardly.

Other objects, features and advantages of the present invention will become more fully understood from the detailed description given hereinbelow and the accompanying drawings.

DESCRIPTION OF EMBODIMENTS

Hereinafter, referring to drawings, a water heater according to an embodiment of the present invention will be described in detail.

Figure 1:
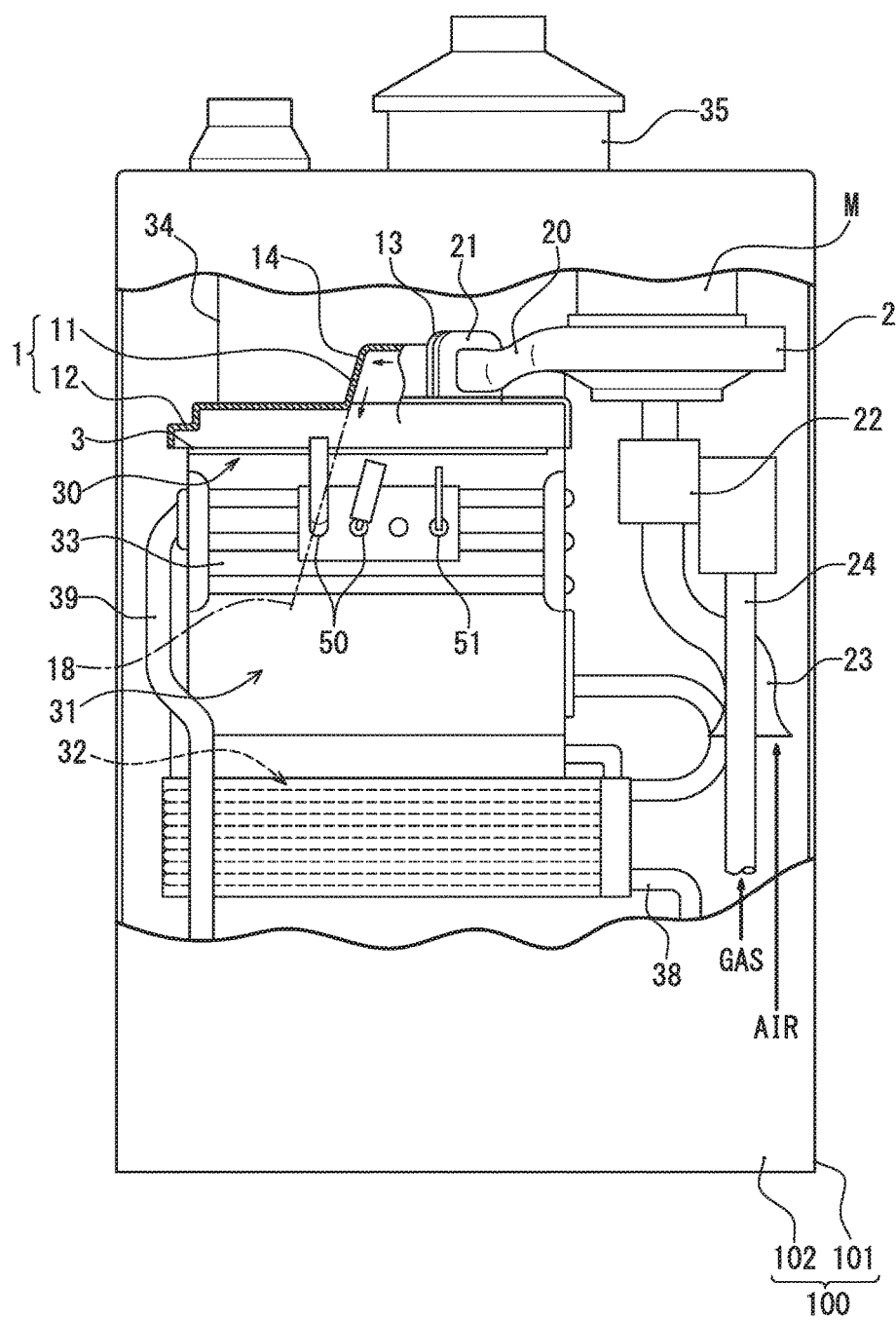
FIG. 1 is a schematic configuration view showing one example of a water heater according to an embodiment of the present invention.

FIG. 1 is a schematic configuration view of a latent heat recovery type-gas water heater including an all primary air combustion type-flat burner (3), as viewed from a frontward direction provided with a door (102). A casing (100) includes a rectangular box shaped casing body (101) having an opening in a front portion, and the door (102) opening/closing the opening. In this specification, a side on which the door (102) of the casing (100) is provided is referred to as a front side, an opposite side facing the door (120) is referred to as a rear side, a direction in which those oppose each other is referred to as a front-and-rear direction, a lateral direction orthogonal to the front-and-rear direction is referred to as a left-and-right direction, and a height direction orthogonal to the front-and-rear direction is referred to as an up-and-down direction.

The casing (100) accommodates a burner body (1) provided with the flat burner (3) having a downward combustion surface (30), and a fan case (2) lying on its side and communicated with the burner body (1), and the flat burner (3) and the fan case (2) are aligned in the left-and-right direction. Inside the fan case (2), a vertical shaft fan (not shown) for supplying a mixture gas of air and fuel gas to the flat burner (3) provided on a lower surface of the burner body (1) is accommodated.

First and second heater exchangers (31) and (32) for supplying hot water that are heated by combustion exhaust gas from the flat burner (3), are consecutively disposed below the burner body (1) or below the flat burner (3). A mixing device (22) for mixing the air with the fuel gas is consecutively disposed upstream of the fan case (2). An air supply pipe (23) for supplying the air and a gas supply pipe (24) for supplying the fuel gas are coupled to the mixing device (22). In the present specification, following a passage formed by rotation of the fan, a side of the fan case (2) is referred to as an upstream side, and a side of the burner body (1) is referred to as a downstream side.

The flat burner (3) includes a ceramic combustion plate having many flame ports opening downwardly or a combustion mat made by knitting metal fabric woven like a net, and has the downward combustion surface (30). The flat burner (3) is of the all primary air combustion type, and burns the mixture gas obtained by mixing all air as primary combustion air supplied from the air supply pipe (23) into the mixing device (22) with the fuel gas.

Amounts of the air and the fuel gas in the mixture gas produced in the mixing device (22) are adjusted by changing a rotation speed of a motor (M) for rotating the fan (10a) above the fan case (2).

The first heat exchanger (31) is of the sensible heat recovery type and is disposed in an intermediate region of the casing (100) in the up-and-down direction, and the second heat exchanger (32) is of the latent heat recovery type and is continuously connected to a bottom part of the first heat exchanger (31). Therefore, water supplied through a water supply pipe (38) connected to an upstream side of the second heat exchanger (32) is heated by latent heat of the combustion exhaust gas from the flat burner (3) in the second heat exchanger (32), and is then heated by sensible heat of the combustion exhaust gas in the first heat exchanger (31).

Subsequently, the water heated to a predetermined temperature is discharged through a hot-water supply pipe (39) connected to a downstream side of the first heat exchanger (31).

The combustion exhaust gas passing through the second heat exchanger (32) is discharged through an exhaust duct (34) and an exhaust cylinder (35) protruding from a top surface of the casing body (101) to the outside. Although not shown, drain generated in the second heat exchanger (32) is recovered by a drain receiver to be discharged to the outside after neutralized by a neutralizer.

Figure 2:
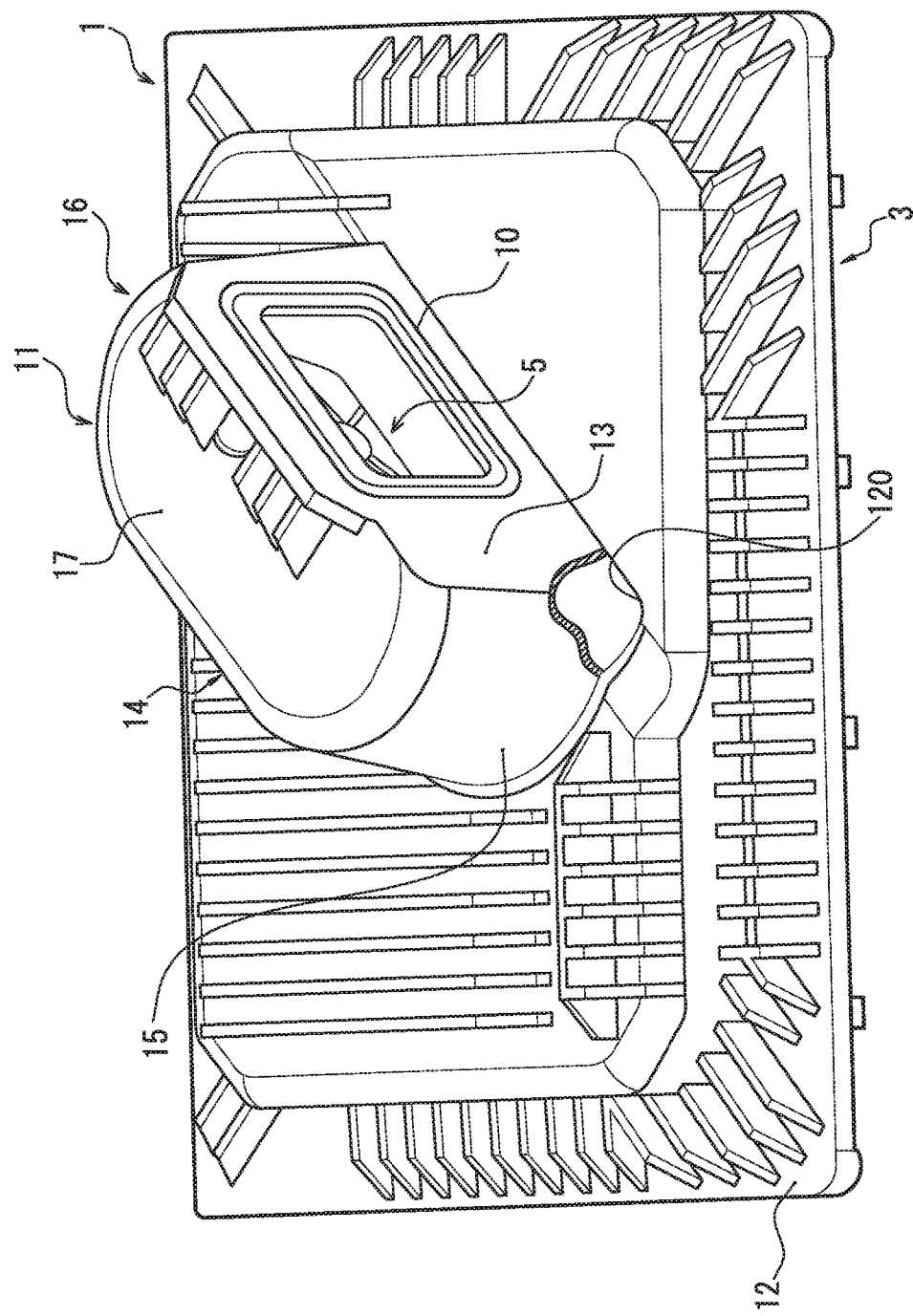
FIG. 2 is a schematic partial cut-away perspective view showing one example of a burner body of the water heater according to the embodiment of the present invention.
Figure 3:
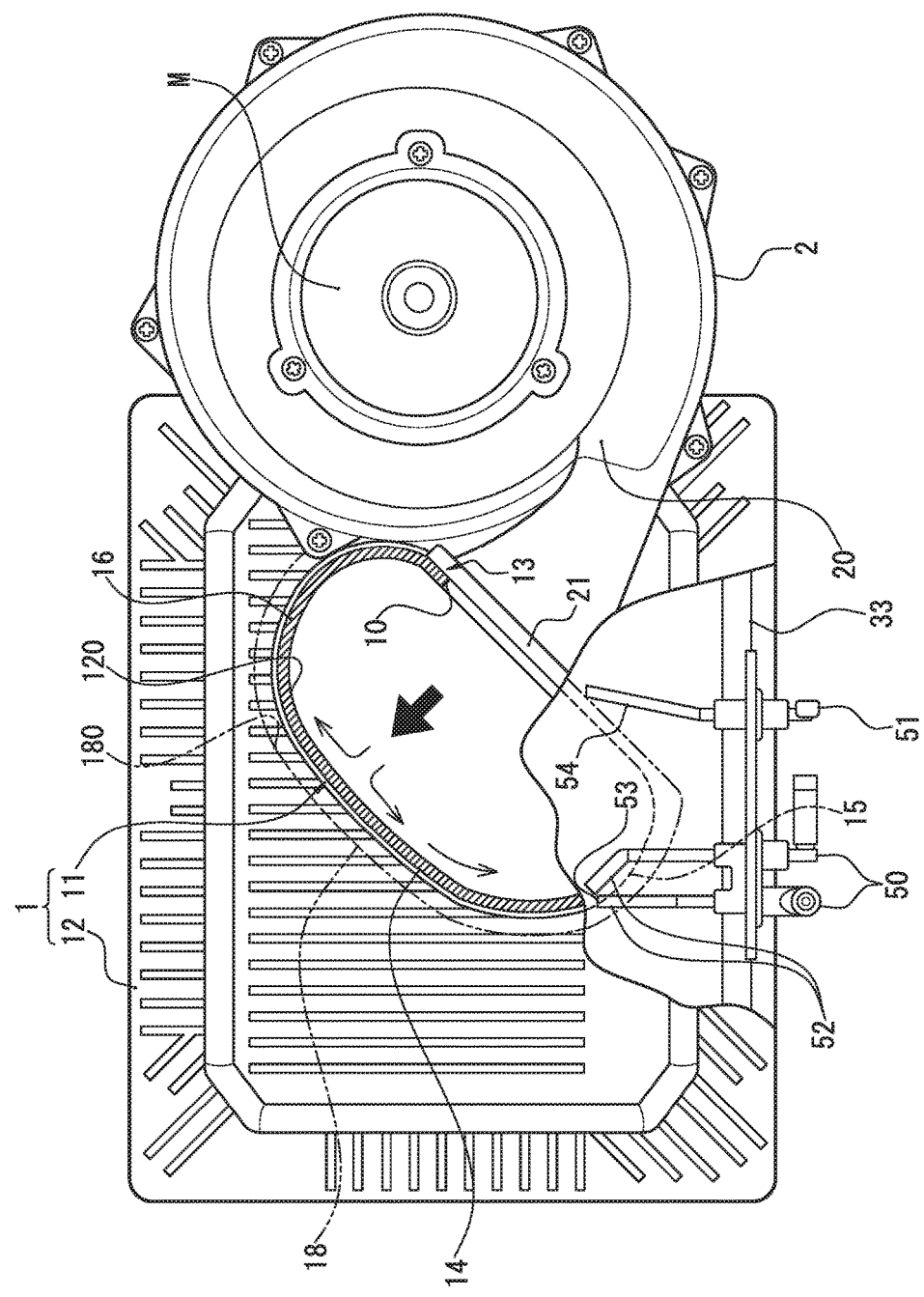
FIG. 3 is a schematic partial cut-away plan view showing one example of the burner body and a fan case of the water heater according to the embodiment of the present invention.
Figure 4:
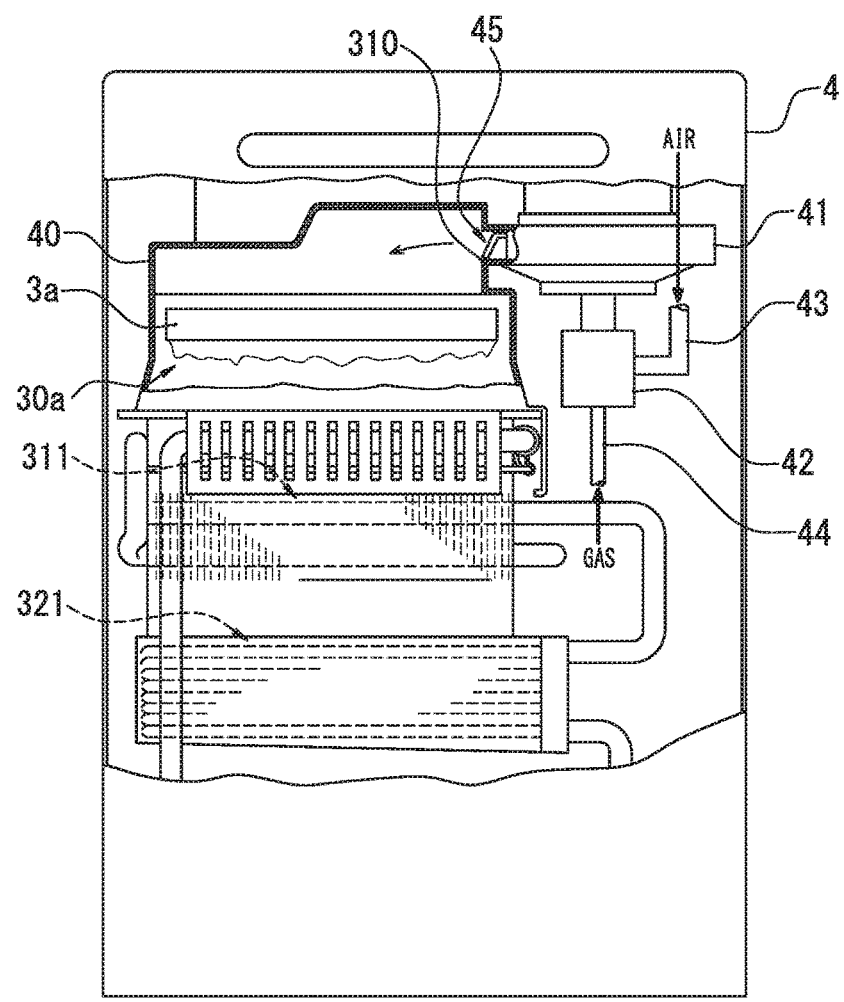
FIG. 4 is a schematic configuration view of a conventional water heater.

As shown in FIGS. 2 and 3, the burner body (1) has: a main burner body unit (12) that has an introduction port (120) formed in a substantially central portion of an upper surface, the flat burner (3) provided on a lower surface, and a substantially flat rectangular shape long in the left-and-right direction; and an introducing unit (11) that is in communication with the introduction port (120), and protrudes upward from the upper surface of the main burner body unit (12). The introducing unit (11) has wall sections as a peripheral wall standing on the upper surface of the main burner body unit (12) and an upper wall (17) covering an upper portion of the peripheral wall, and thereby forming a cylindrical body having a downward opening and a substantially oval cross-section. Additionally, the introducing unit (11) is disposed in such a manner that long sides of the cylindrical body are inclined diagonally at 45 degrees in a counterclockwise direction with respect to a long side (front side) of the main burner body unit (12) in planar view as viewed from above.

As shown in FIGS. 1 and 3, a substantially rectangular connection flange (21) extends outward from a periphery of the blowout port at a downstream open end of a flow channel (20) of the fan case (2).

The peripheral wall of the introducing unit (11) includes a planar fan installation wall section (13) to which the connection flange (21) of the fan case (2) is coupled, a planar opposite wall section (14) facing the fan installation wall section (13), and semicircular front and rear wall sections (15) and (16) that respectively bridge the fan installation wall section (13) and the opposite wall section (14) on the front and rear sides. Moreover, the wall sections (13), (14), (15), and (16) are slightly inclined in such a manner that the inner surfaces of the wall sections flare from the upper wall (17) toward the upper surface of the main burner body unit (12).

Preferably, the inner surfaces of the wall sections (13), (14), (15), and (16) are formed so as to be substantially vertical (about 90 degrees to about 110 degrees) to the upper surface of the main burner body unit (12). It is to be noted, in the embodiment, that a front end adjacent to the front wall section (15) is a frontward end of the fan installation wall section (13), and a rear end adjacent to the rear wall section (16) is a rearward end of the fan installation wall section (13).

The fan installation wall section (13) has a substantially rectangular inlet port (10), and a center of the inlet port (10) is displaced rearward from a center of the fan installation wall section (13). Accordingly, when the connection flange

(21) of the fan case (2) is attached to the fan installation wall section (13), the burner body (1) is connected in communication with the fan case (2).

Additionally, as shown in FIG. 3, a part of the fan case (2) overlaps the upper surface of the main burner body unit (12) as viewed from above. Since the center of the inlet port (10) formed in the fan installation wall section (13) is displaced rearward from the center of the fan installation wall section (13), a distance from a front end of the inlet port (10) to the front wall section (15) is greater than a distance from a rear end of the inlet port (10) to the rear wall section (16), in the introducing unit (11). Accordingly, an inner space in front of the inlet port (10) in the introducing unit (11) is larger than an inner space behind the inlet port (10) in the introducing unit (11).

The fan installation wall section (13) of the introducing unit (11) is inclined in such a manner that the frontward end is located in a substantially central portion of a frontward portion of the upper surface of the main burner body unit (12) in the left-and-right direction, and that the rearward end is located in a right side portion of a rearward portion of the upper surface of the main burner body unit (12). This configuration allows an operator to install the fan case (2) to the fan installation wall section (13) and to remove the fan case (2) for maintenance of a check valve (5), for example, through the door (102) in a frontward portion of the casing (100). Thereby, workability can be improved.

The check valve (5) as a backflow preventing member is inserted through the inlet port (10) into the introducing unit (11) in such a manner that acid drain ascending from the second heat exchanger (32) does not flow back from the burner body (1) to the fan case (2) and the mixing device (22), after combustion of the flat burner (3) is turned off (FIG. 2).

Additionally, as shown in FIG. 1, an ignition electrode (50) and an ignition detector (51) are attached to a front surface of a vessel (33) of the first heat exchanger (31) below the burner body (1). Therefore, attachment of the ignition electrode (50) and the ignition detector (51) in manufacturing and removal in maintenance can be made through the door (102) in the frontward portion of the casing (100). Thereby, the workability can be further improved.

As shown in FIG. 3, the ignition electrode (50) has an electrode rod (52) extending from the front surface into the vessel (33). As described above, the inner surfaces of the fan installation wall section (13), the opposite wall section (14), and the front and rear wall sections (15) and (16) of the introducing unit (11) slightly flare downward. Accordingly, as shown in FIG. 3, a projection plane (180), which is defined by extending a projection line (18) of each of the wall sections projected on the flat burner (3) disposed below to a position of the ignition electrode (50) disposed further below, is slightly larger than the introduction port (120) formed in the upper surface of the main burner body unit (12). A discharging portion (53) which is formed at a tip end of the ignition electrode (50) is located within the projection plane (180) at a height of the discharging portion (53) and near the projection line (18) of the front wall section (15).

In a hot-water supply operation of the water heater according to the embodiment, the flat burner (3) is ignited in response to supply of the water through the water supply pipe (38). Subsequently, the fan in the fan case (2) is rotated by the motor (M) to introduce the external air passing through the air supply pipe (23) and the fuel gas passing through the gas supply pipe (24) into the mixing device (22), and the air and the fuel gas are mixed to generate the mixture gas for combustion. The mixture gas is fed from a downstream end of the flow channel (20) of the fan case (2) through the inlet port (10) to the introducing unit (11) of the burner body (1).

The mixture gas fed through the inlet port (10) into the introducing unit (11) flows toward the opposite wall section (14) facing the fan installation wall section (13) having the inlet port (10) and collides with the opposite wall section (14), as indicated by the thick arrow in FIG. 3. The mixture gas then turns its flow direction, so that part of the mixture gas flows downwardly along the substantially vertical opposite wall section (14) as indicated by the arrow in FIG. 1, and other part of the mixture gas flows downwardly divided to paths on a front wall section (15) side and a rear wall section (16) side in the introducing unit (11) as indicated by the thin arrows in FIG. 3. In the water heater according to the embodiment described above, a part of the fan case (2) lying on its side overlaps the upper surface of the main burner body unit (12) to minimize the height of the casing (100). Accordingly, the mixture gas is laterally blown from the downstream end of the fan case (2) into the introducing unit (11). However, the peripheral wall of the introducing unit (11) turns the flow direction of the mixture gas as described above, which prevents the mixture gas passing through the inlet port (10) from flowing only in the blowing direction, whereby the mixture gas can be evenly supplied over the flat burner (3) disposed below.

Furthermore, since the center of the inlet port (10) is displaced rearward from the center of the fan installation wall section (13), the inner space in front of the inlet port (10) in the introducing unit (11) is larger than the inner space behind the inlet port (10) in the introducing unit (11). Moreover, the fan installation wall section (13) of the introducing unit (11) is inclined with respect to the main burner body unit (12) in such a manner that the frontward end adjacent to the front wall section (15) is located in the substantially central portion of the frontward portion of the main burner body unit (12) in the left-and-right direction, and that the rearward end adjacent to the rear wall section (16) is located in the right side portion of the rearward portion of the main burner body unit (12). Accordingly, the mixture gas downwardly flowing from the large front inner space in the introducing unit (11) is smoothly directed to a central region in the frontward direction, particularly to a region along the projection line (18) of the front wall section (15) within the projection plane (180) formed by downwardly projecting the peripheral wall. Since the discharging portion (53) of the ignition electrode (50) resides within the projection plane (180) in the frontward direction, a large amount of the mixture gas flows toward the discharging portion (53) with a concentrated manner. Therefore, when a spark discharge is generated from the discharging portion (53), ignition can be made quickly. The mixture gas passing through the inlet port (10) is distributed not only in the blowing direction but also over the entire area of the flat burner (3) disposed below. This facilitates rapid spread of a flame generated at the ignition electrode (50) over substantially the entire area of the flat burner (3), enabling even combustion on the combustion surface (30).

Further, since the ignition electrode (50) and the ignition detector (51) for detecting the ignition are attached to predetermined spots on the front surface of the vessel (33) of the first heat exchanger (31), respectively, this facilitates the attachment or removal of those members in manufacturing or maintenance through the door in the frontward portion of the casing (100). Furthermore, the introducing unit (11) which is slightly displaced frontward from a central portion of the main burner body unit (12) allows the mixture gas to be readily concentrated on the discharging portion (53) of the ignition electrode (50) in the frontward direction. Accordingly, the electrode rod (52) of the ignition electrode (50) and the detection rod (54) of the ignition detector (51) may have short lengths, respectively.

Further, when the connection flange (21) of the fan case (2) is installed to or removed from the fan installation wall section (13) of the burner body (1), the operator can see an installation place from the frontward portion of the casing (100) during the operation. Thereby, the workability in manufacturing and maintenance can be improved.

It is to be noted that the fan case (2) may be located on the left of the burner body (1) although the fan case (2) is located on the right of the burner body (1) in the embodiment described above. In this case, the configuration of the introducing unit (11) is bilaterally symmetric to that in the embodiment described above.

Further, it is to be noted that the inlet port (10) may be provided in such a manner that the center of the inlet port (10) is displaced frontward from the center of the fan installation wall section (13). In this case, the ignition electrode (50) and the ignition detector (51) are attached to a rear surface of the vessel (33) of the first heat exchanger (31) in such a manner that the discharging portion (53) and the detection rod (54) extend to the vicinity of apart of the projection line (18) of the rear wall section (16) within the projection plane (180) formed by downwardly projecting the peripheral wall of the introducing unit (11). Thereby, the water heater excellent in ignition performance and combustion performance can be obtained.

As described in detail, the present invention is summarized as follows.

According to one aspect of the present invention, there is provided a water heater comprising a casing including a casing body having an opening in a front portion, and a door configured to open and close the opening, wherein the casing accommodates:

a burner body including a flat burner having a downward combustion surface;

a fan case being in communication with the burner body and lying on its side;

a vertical shaft fan disposed in the fan case and configured to supply a mixture gas containing combustion air and fuel gas to the burner body; and an ignition electrode disposed below the flat burner, wherein the burner body includes:

a main burner body unit having an introduction port through which the mixture gas is supplied in a substantially central portion of an upper surface thereof, and the flat burner on a lower surface thereof; and an introducing unit being in communication with the introduction port, protruding upward from the upper surface of the main burner body unit, and laterally having an inlet port being in communication with the fan case, wherein an inner surface of an opposite wall section facing the inlet port in a peripheral wall of the introducing unit has a substantially vertical surface, and a discharging portion of the ignition electrode is disposed within a projection plane when the peripheral wall of the introducing unit is projected downwardly.

As described above, according to the water heater, the mixture gas for combustion is supplied through the introducing unit having the inlet port in communication with the fan case into the main burner body unit having the flat burner. The introducing unit protrudes upward from the upper surface of the main burner body unit, and has the inlet port formed in one side thereof. Moreover, the fan case lying on its side accommodates the vertical shaft fan having a vertical rotational shaft. Accordingly, the mixture gas introduced from the fan case to the burner body is laterally fed to the introducing unit.

Since the inner surface of the opposite wall section facing the inlet port of the introducing unit is substantially vertical, the mixture gas laterally fed through the inlet port collides with the opposite wall section. The mixture gas then reduces its flow rate after the collision with the opposite wall section, part of the mixture gas flows downwardly, and other part of the mixture gas downwardly flows while circulating along the peripheral wall of the introducing unit. Additionally, since the introducing unit is communicated with the main burner body unit through the introduction port, the mixture gas flowing downward at the reduced flow rate after the collision with the opposite wall section is fed into the main burner body unit through the introduction port. Since the introduction port is disposed on the substantially central portion of the upper surface of the main burner body unit, the mixture gas fed through the introduction port into the main burner body unit is blown from a substantially upper central portion of the main burner body unit to a substantially central area of the flat burner, and in turn spreads over the entire area of the flat burner.

Furthermore, since the discharging portion of the ignition electrode is disposed within the projection plane when the peripheral wall of the introducing unit protruding from the upper face of the main burner body unit is projected downwardly, the mixture gas fed through the introduction port to the flat burner is rapidly concentrated on the discharging portion. Therefore, when a spark discharge is generated from the ignition electrode, the flat burner can be ignited reliably and smoothly. Moreover, the mixture gas flowing at the reduced flow rate after collision with the opposite wall section spreads over the entire area of the flat burner after the ignition. Consequently, a flame generated by the ignition at the discharging portion is prevented from rapidly spreading over the entire area of the flat burner but smoothly spreads over the entire area of the flat burner. This enables even combustion.

Further, according to the water heater described above, since the introduction unit protruding from the upper surface of the burner body is communicated with the fan case lying on its side, a part of the fan case overlaps the upper surface of the burner body as viewed from above. Therefore, there is no need to secure a large space in an upper region of the casing.

Preferably, in the water heater described above, the peripheral wall of the introducing unit includes a fan installation wall section having the inlet port, the fan case being installed to the fan installation wall section, when a door side of the casing is a front side and a back side of the casing is a rear side, the inlet port is displaced frontward or rearward from a center of the fan installation wall section, and the discharging portion of the ignition electrode is disposed further away from the inlet port in a frontward direction or a rearward direction within the projection plane.

As described above, the mixture gas fed through the inlet port into the introduction unit collides with the opposite wall section, and then part of the mixture gas flows below the opposite wall section and other part of the mixture gas downwardly flows while circulating in the frontward and rearward direction along the peripheral wall of the introducing unit. Accordingly, in a case where the inlet port is displaced frontward from the center of the fan installation wall section, an inner space behind the inlet port in the introducing unit is larger than an inner space in front of the inlet port in the introducing unit. Consequently, an amount of the mixture gas flowing from the inlet port in the rearward direction increases, whereby the mixture gas supplied into the main burner body unit through the introduction port tends to flow toward a rearward area of the flat burner.

On the other hand, in a case where the inlet port is displaced rearward from the center of the fan installation wall section, the inner space in front of the inlet port in the introducing unit is larger than the inner space behind the inlet port in the introducing unit. Consequently, the amount of the mixture gas flowing from the inlet port in the frontward direction increases, whereby the mixture gas supplied into the main burner body unit through the introduction port tends to flow toward a frontward area of the flat burner.

As described above, the amount of the mixture gas flowing toward the rearward area of the flat burner increases when the inlet port is displaced frontward from the center of the fan installation wall section, whereas the amount of the mixture gas flowing toward the frontward area of the flat burner increases when the inlet port is displaced rearward from the center of the fan installation wall section. Therefore, in a case where the ignition electrode is disposed further away from the inlet port in the frontward direction or the rearward direction within the projection plane, the large amount of the mixture gas flows toward the discharging portion of the ignition electrode with a concentrated manner, enabling further rapid ignition.

Preferably, in the water heater described above, the fan installation wall section is inclined with respect to the main burner body unit as viewed from above in such a manner that a frontward end is located in a substantially central portion of a frontward portion of the main burner body unit and a rearward end is located in one side portion close to the fan case.

According to the water heater described above, since the frontward end of the introducing unit is located in the substantially central portion of the frontward portion of the main burner body unit in the left-and-right direction, the mixture gas supplied through the introduction port tends to flow toward the frontward area of the flat burner. Therefore, in a case where the discharging portion of the ignition electrode is disposed in the frontward direction, this enables further rapid ignition. Furthermore, since the flat burner is ignited near the central area in the left-and-right direction, the flame evenly spreads over the entire area of the flat burner in the left-and-right direction. Furthermore, since the fan installation wall section is inclined with respect to a peripheral wall of the main burner body unit in such a manner that the rearward end of the fan installation wall section is located in a side portion close to the fan case, the mixture gas is obliquely fed into the introducing unit. Therefore, the mixture gas collides with the peripheral wall of the main burner body unit at an angle. As a result, the flow of the mixture gas becomes turbulent, the flow rate of the mixture gas in one direction decreases. This enables promoting even combustion on the entire area of the flat burner. Moreover, according to the water heater described above, since the fan installation wall section is disposed so as to face to a diagonally front direction, the operator can see the fan installation wall section from the frontward portion of the casing.

As described above, according to the present invention, the mixture gas for combustion laterally fed through the inlet port from the fan case collides with the substantially vertical opposite wall section and then turns its flow direction downwardly while reducing the flow rate, so that the mixture gas flows from the introduction port formed in the substantially central portion of the upper surface of the main burner body toward the flat burner disposed below. On the other hand, the ignition electrode is disposed within the projection plane formed by downwardly projecting the wall sections as the peripheral wall of the introducing portion. This configuration allows the mixture gas to be readily concentrated on the discharging portion of the ignition electrode, enabling a reliable and smooth ignition. Further, the flame generated by the ignition electrode spreads smoothly and evenly over the entire area of the flat burner. This enables even combustion over the entire area of the flat burner. Accordingly, the ignition performance and the combustion performance of the flat burner can be improved.

Furthermore, according to the present invention, since the fan case lying on its side is disposed in such a manner that a part of the fan case overlaps the upper surface of the main burner body unit, the casing accommodating those members can be minimized. Accordingly, the water heater suitable for space saving can be obtained.

Moreover, according to the present invention, since the introducing unit is inclined with respect to the main burner body unit in such a manner that the fan installation wall section in the peripheral wall of the introducing unit, which has the inlet port and is connected to the fan case, faces to a diagonally front direction, the ignition electrode can be inserted into the water heater from the frontward portion of the casing. Accordingly, the operator can see work spots from the frontward portion of the casing in not only the installation of the fan case in manufacturing but the removal of the fan case in maintenance and further the attachment and removal of the ignition electrode. Thereby, the workability can be improved.

Although the present invention has been described in detail, the foregoing descriptions are merely exemplary at all aspects, and do not limit the present invention thereto. It should be understood that an enormous number of unillustrated modifications may be assumed without departing from the scope of the present invention.

INDUSTRIAL APPLICABILITY

According to the present invention, there is provided the water heater having excellent in ignition performance, combustion performance, and workability in manufacturing and maintenance.

The invention claimed is:

1. A water heater comprising a casing including a casing body having an opening in a front portion, and a door configured to open and close the opening, wherein
the casing accommodates:
a burner body including a flat burner having a downward combustion surface;
a fan case being in communication with the burner body and lying on its side;
a vertical shaft fan disposed in the fan case and configured to supply a mixture gas containing combustion air and fuel gas to the burner body; and
an ignition electrode disposed below the flat burner, wherein
the burner body includes:
a main burner body unit having an introduction port through which the mixture gas is supplied in a substantially central portion of an upper surface thereof, and the flat burner on a lower surface thereof; and an introducing unit being in communication with the introduction port, protruding upward from the upper surface of the main burner body unit, and laterally having an inlet port being in communication with the fan case, wherein an inner surface of an opposite wall section facing the inlet port in a peripheral wall of the introducing unit has a substantially vertical surface, and a discharging portion of the ignition electrode is disposed within a projection plane when the peripheral wall of the introducing unit is projected downwardly.

2. The water heater according to claim 1, wherein the peripheral wall of the introducing unit includes a fan installation wall section having the inlet port, the fan case being installed to the fan installation wall section, when a door side of the casing is a front side and a back side of the casing is a rear side, the inlet port is displaced frontward or rearward from a center of the fan installation wall section, and the discharging portion of the ignition electrode is disposed further away from the inlet port in a frontward direction or a rearward direction within the projection plane.

3. The water heater according to claim 2, wherein the fan installation wall section is inclined with respect to the main burner body unit as viewed from above in such a manner that a frontward end is located in a substantially central portion of a frontward portion of the main burner body unit and a rearward end is located in one side portion close to the fan case.

* * * * *